United States Patent
Coursaux et al.

(10) Patent No.: US 11,715,118 B1
(45) Date of Patent: Aug. 1, 2023

(54) PRODUCT PERFORMANCE WITH LOCATION ON PAGE ANALYSIS

(71) Applicant: Content Square SAS, Paris (FR)

(72) Inventors: Paul Coursaux, Paris (FR); Raphaël Rose-Andrieux, Paris (FR)

(73) Assignee: Content Square SAS, Paris (FR)

( * ) Notice: Subject to any disclaimer, the term of this patent is extended or adjusted under 35 U.S.C. 154(b) by 0 days.

(21) Appl. No.: 17/708,514

(22) Filed: Mar. 30, 2022

(51) Int. Cl.
*G06Q 10/00* (2023.01)
*G06Q 30/0201* (2023.01)

(52) U.S. Cl.
CPC .............................. *G06Q 30/0201* (2013.01)

(58) Field of Classification Search
None
See application file for complete search history.

(56) References Cited

U.S. PATENT DOCUMENTS

| | | | | |
|---|---|---|---|---|
| 11,328,241 | B2 * | 5/2022 | Kilic | G06Q 10/06393 |
| 2009/0083258 | A1 * | 3/2009 | Koren | G06Q 30/0631 |
| | | | | 707/999.005 |
| 2012/0143718 | A1 * | 6/2012 | Graham | G06Q 30/0631 |
| | | | | 705/26.7 |
| 2013/0238391 | A1 * | 9/2013 | Klumpp | G06Q 30/02 |
| | | | | 705/7.29 |
| 2014/0181087 | A1 * | 6/2014 | Wu | G06F 3/04842 |
| | | | | 707/722 |
| 2014/0229280 | A1 * | 8/2014 | Larner | H04N 21/4668 |
| | | | | 705/14.53 |
| 2016/0005097 | A1 * | 1/2016 | Hsiao | G06Q 30/0631 |
| | | | | 705/26.7 |
| 2016/0026691 | A1 * | 1/2016 | Error | G06F 16/9535 |
| | | | | 707/755 |
| 2016/0189210 | A1 * | 6/2016 | Lacey | G06N 20/00 |
| | | | | 705/7.31 |
| 2020/0019644 | A1 * | 1/2020 | Mazouchi | G06F 16/951 |
| 2020/0104703 | A1 * | 4/2020 | Yun | G06V 40/174 |
| 2020/0167448 | A1 * | 5/2020 | Modarresi | G06V 10/82 |
| 2020/0265100 | A1 * | 8/2020 | Hu | G06F 16/9577 |
| 2020/0267203 | A1 * | 8/2020 | Jindal | H04L 67/025 |
| 2021/0065260 | A1 * | 3/2021 | Zheng | G06N 3/045 |
| 2021/0200943 | A1 * | 7/2021 | Aviyam | G06F 16/953 |
| 2021/0312493 | A1 * | 10/2021 | Taylor | G06N 3/08 |
| 2022/0020077 | A1 * | 1/2022 | Lindgren | G06F 16/9535 |
| 2022/0076320 | A1 * | 3/2022 | Hu | G06N 3/042 |
| 2022/0114639 | A1 * | 4/2022 | Christensen | G06T 1/20 |

OTHER PUBLICATIONS

Sharpe, Sam, Dynamic Customer Embeddings & Understanding Customer Intent, Sep. 22, 2021, Capitalone, https://www.capitalone.com/tech/machine-learning/dynamic-customer-embeddings-sequential-recommendation-representation-learning/, p. 1-10. (Year: 2021).*

\* cited by examiner

*Primary Examiner* — Joseph M Waesco
(74) *Attorney, Agent, or Firm* — Schwegman Lundberg & Woessner, P.A.

(57) ABSTRACT

Systems and techniques may be used for providing information related to an underperforming product. An example technique may include determining, for products in a particular zone of a website, an underperforming product based on pageviews or interaction metrics of users visiting the website. The technique may include identifying a product type of the underperforming product, and outputting a recommendation for display. The recommendation may include at least one replacement product of the product type, other than the underperforming product, to replace the underperforming product in the particular zone.

20 Claims, 10 Drawing Sheets

PRODUCT PERFORMANCE

| START DATE | 2022-01-17 |
| END DATE | 2022-01-24 |
| ZONE | 2ND LEVEL CATEGORY BEST SALES ▽ |

ZONE ANALYSIS

| ITEM ID | CATEGORY | NAME | DISPLAYED IN ZONE | CLICKED |
|---|---|---|---|---|
| 123456 | CLOTHING | PANTS A | 126 | 0 |
| 234567 | CLOTHING | SHOES A | 89 | 0 |
| 345678 | CLOTHING | PATNS B | 45 | 0 |
| 456789 | FURNITURE | PATIO CHAIR | 34 | 0 |
| 567891 | FURNITURE | DESK | 17 | 0 |

FIG. 7

PRODUCT PERFORMANCE WITH LOCATION ON PAGE ANALYSIS

BACKGROUND

Web commerce has become a nearly universal way to sell products. Managing web commerce websites is often done by a team of people, who use web analytics to make design, structural, and interactive choices for the web commerce websites. Sales data from a website may be used to determine whether a product is successful. However, the sales data does not tell the entire story, nor does it provide sufficient data to make proactive decisions.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 7 is an example user interface showing a client user interface including product performance with a zone analysis in accordance with some examples.

DETAILED DESCRIPTION

Figure 1:
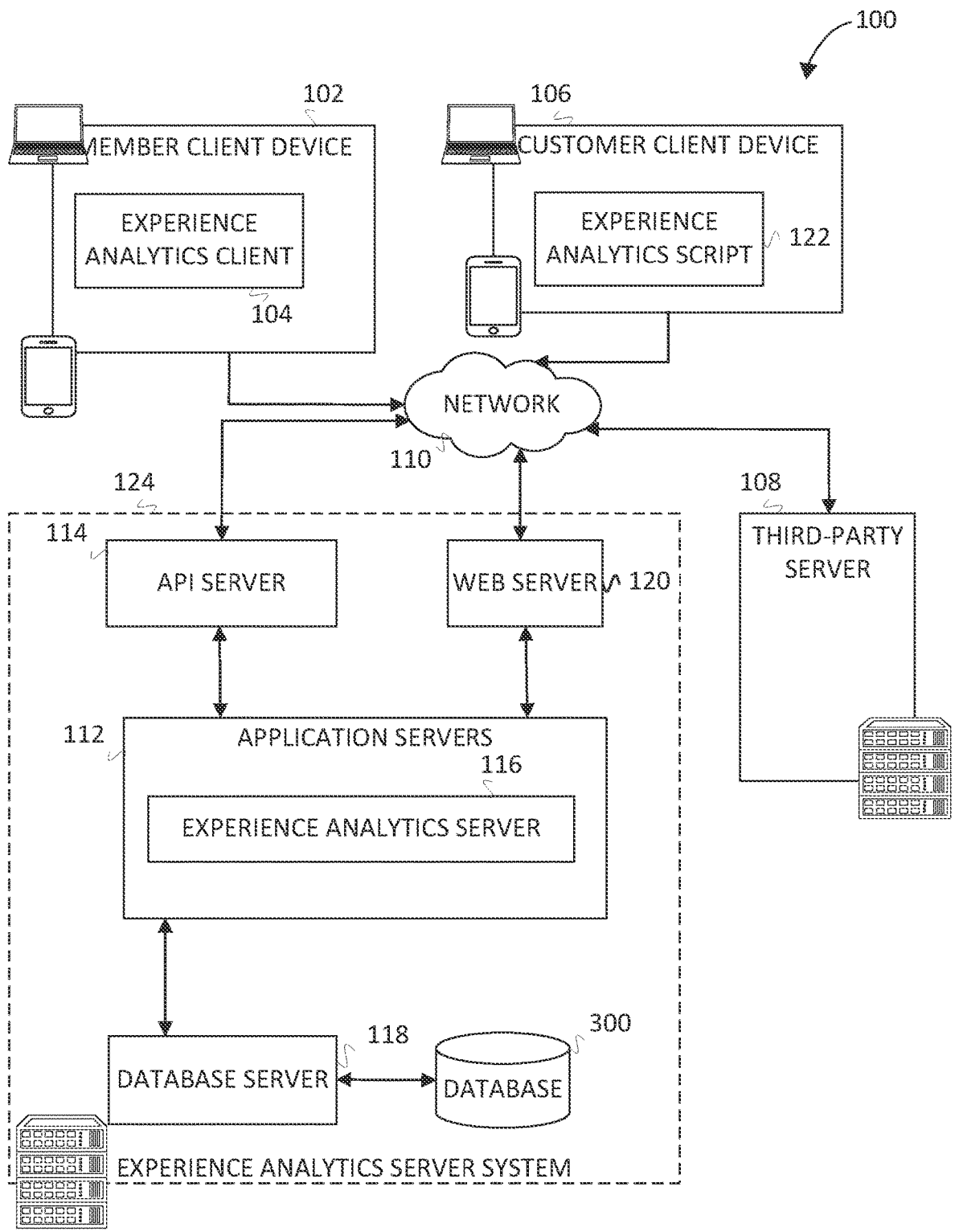
FIG. 1 is a diagrammatic representation of a networked environment in which the present disclosure may be deployed, in accordance with some examples.

Systems and techniques described herein provide information related to an underperforming product. An underperforming product may be identified using the systems and techniques described herein. For example, an underperforming product may be identified for a particular client, a particular website, a particular page, a particular zone, or the like. An underperforming product may include one that has a relatively low metric (e.g., falls below a threshold for a metric), such as attractiveness, conversion rate, or the like.

Once an underperforming product is identified, the systems and techniques described herein may provide a recommended action related to the underperforming product. For example, a replacement product for the underperforming product may be recommended. The replacement product may include a best selling product, a most similar product, or the like. The replacement product may be determined using a machine learning trained model, for example one trained to determine a similar product, a product type or category, etc. The recommendation may be specific to one or more circumstances that correspond to the underperforming product, such as a zone, types of users accessing a website, product type, etc.

The systems and techniques described herein provide a technical solution to the technological problem of identifying replacement products for underperforming products. The problem involves multiple technological issues, such as how to identify underperforming products, how to identify similar products or product types, or what similar product to recommend as a replacement to an underperforming product. These issues, among others, are resolved by the present technical solutions, which include using objective metrics to identify underperforming products, machine learning or other tools to identify similar products or product types, or recommending a replacement based on various objective techniques (e.g., threshold comparison, best selling replacement product of same type, most similar product, etc.).

When a product at a given location (e.g., in a zone, on a particular page, etc.) is performing poorly (e.g., few clicks, zero clicks, low conversion rate, low attractiveness rate, below a threshold in one of these categories, etc.), a replacement suggestion may be determined and output for display. The suggestion may indicate a replacement location for the product (e.g., where the product has done better historically, or where products in general or of a particular type do better), a different product, or the like. A replacement product may be a most similar product to the one being replaced (e.g., with a higher metric) or a best seller in a product category corresponding to a category of the product being replaced. For example, when a client has a promo banner, an insight may be generated to indicate which products were displayed, which are performing above a threshold, which performing below a threshold, and optionally a recommendation for changing one or more products in the promo banner.

The product to be replaced may include a product that has been out of stock (e.g., over at least one time period being examined), a product that is overpriced, a product that is underperforming (e.g., never clicked), or the like. After identifying a product to be replaced, a replacement product may be identified. In some examples, the replacement product may be a product that is most similar (e.g., identified via a machine learning model, a product catalog, a database of products, or the like), a best seller of a category of the product to be replaced, a product identified as being potentially successful (e.g., at a threshold likelihood of having more sales, clicks, etc.) in this location (e.g., a product or kind of product may be identified that historically performed well in the location or in a similar zone).

A product category or most similar product may be identified at one or more levels of granularity. For example, a most similar product or product category may be determined at a high level, such as all shoes, at a middle level (e.g., all loafers, all shoes size 12, etc.), or at a low level (e.g., loafers size 12 in grey or loafers size 12 brand A). In some examples, a low level category may include a set of product specifications that must be entirely or mostly identical (e.g., one product specification difference, or none), and a high level category may include any large grouping of products (e.g., all televisions), with middle level categories in between.

Product performance may be analyzed based on how a user accessed a website. For example, when the user arrives from an online marketplace, a social media page, an advertisement, a landing page, directly accessing a page (e.g., from a bookmark), etc.

In some examples, two or more zones may be compared to determine their relative performance to each other. In these examples, a zone content or a zone value may be determined. For example, consider two zones, A and B, where a product X is in zone A and is successful, and a product Y is in zone A which is unsuccessful, while zone B has the opposite result. In this example, zone B may look worse when only comparing product X, but when comparing product Y, zone B may look better than zone A. To compare the zones, products of similar types or categories may be considered. In some examples, zones may be identified where all or most products are unsuccessful, which may indicate an issue with the zone rather than with the products within the zone. In this example, the zone may be excluded or lower weighted for consideration of product performance of the products in the zone. In some examples, zones may be ranked.

Networked Computing Environment

FIG. 1 is a block diagram showing an example experience analytics system 100 that analyzes and quantifies the user experience of users navigating a client's website, mobile websites, and applications. The experience analytics system 100 can include multiple instances of a member client device 102, multiple instances of a customer client device 106, and multiple instances of a third-party server 108.

The member client device 102 is associated with a client of the experience analytics system 100, where the client that has a website hosted on the client's third-party server 108. For example, the client can be a retail store that has an online retail website that is hosted on a third-party server 108. An agent of the client (e.g., a web administrator, an employee, etc.) can be the user of the member client device 102.

Each of the member client devices 102 hosts a number of applications, including an experience analytics client 104. Each experience analytics client 104 is communicatively coupled with an experience analytics server system 124 and third-party servers 108 via a network 110 (e.g., the Internet). An experience analytics client 104 can also communicate with locally-hosted applications using Applications Program Interfaces (APIs).

The member client devices 102 and the customer client devices 106 can also host a number of applications including Internet browsing applications (e.g., Chrome, Safari, etc.). The experience analytics client 104 can also be implemented as a platform that is accessed by the member client device 102 via an Internet browsing application or implemented as an extension on the Internet browsing application.

Users of the customer client device 106 can access client's websites that are hosted on the third-party servers 108 via the network 110 using the Internet browsing applications. For example, the users of the customer client device 106 can navigate to a client's online retail website to purchase goods or services from the website. While the user of the customer client device 106 is navigating the client's website on an Internet browsing application, the Internet browsing application on the customer client device 106 can also execute a client-side script (e.g., JavaScript (.*js)) such as an experience analytics script 122. In one example, the experience analytics script 122 is hosted on the third-party server 108 with the client's website and processed by the Internet browsing application on the customer client device 106. The experience analytics script 122 can incorporate a scripting language (e.g., a .*js file or a .json file).

In certain examples, a client's native application (e.g., ANDROID™ or IOS™ Application) is downloaded on the customer client device 106. In this example, the client's native application including the experience analytics script 122 is programmed in JavaScript leveraging a Software Development Kit (SDK) provided by the experience analytics server system 124. The SDK includes Application Programming Interfaces (APIs) with functions that can be called or invoked by the client's native application.

In one example, the experience analytics script 122 records data including the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The experience analytics script 122 transmits the data to experience analytics server system 124 via the network 110. In another example, the experience analytics script 122 transmits the data to the third-party server 108 and the data can be transmitted from the third-party server 108 to the experience analytics server system 124 via the network 110.

An experience analytics client 104 is able to communicate and exchange data with the experience analytics server system 124 via the network 110. The data exchanged between the experience analytics client 104 and the experience analytics server system 124, includes functions (e.g., commands to invoke functions) as well as payload data (e.g., website data, texts reporting errors, insights, merchandising information, adaptability information, images, graphs providing visualizations of experience analytics, session replay videos, zoning and overlays to be applied on the website, etc.).

The experience analytics server system 124 supports various services and operations that are provided to the experience analytics client 104. Such operations include transmitting data to and receiving data from the experience analytics client 104. Data exchanges to and from the experience analytics server system 124 are invoked and controlled through functions available via user interfaces (UIs) of the experience analytics client 104.

The experience analytics server system 124 provides server-side functionality via the network 110 to a particular experience analytics client 104. While certain functions of the experience analytics system 100 are described herein as being performed by either an experience analytics client 104 or by the experience analytics server system 124, the location of certain functionality either within the experience analytics client 104 or the experience analytics server system 124 may be a design choice. For example, it may be technically preferable to initially deploy certain technology and functionality within the experience analytics server system 124 but to later migrate this technology and functionality to the experience analytics client 104 where a member client device 102 has sufficient processing capacity.

Turning now specifically to the experience analytics server system 124, an Application Program Interface (API) server 114 is coupled to, and provides a programmatic interface to, application servers 112. The application servers 112 are communicatively coupled to a database server 118, which facilitates access to a database 300 that stores data associated with experience analytics processed by the application servers 112. Similarly, a web server 120 is coupled to the application servers 112, and provides web-based interfaces to the application servers 112. To this end, the web server 120 processes incoming network requests over the Hypertext Transfer Protocol (HTTP) and several other related protocols.

The Application Program Interface (API) server 114 receives and transmits message data (e.g., commands and message payloads) between the member client device 102 and the application servers 112. Specifically, the Application Program Interface (API) server 114 provides a set of interfaces (e.g., routines and protocols) that can be called or queried by the experience analytics client 104 or the experience analytics script 122 in order to invoke functionality of the application servers 112. The Application Program Interface (API) server 114 exposes to the experience analytics client 104 various functions supported by the application servers 112, including generating information on errors, insights, merchandising information, adaptability information, images, graphs providing visualizations of experience analytics, session replay videos, zoning and overlays to be applied on the website, etc.

The application servers 112 host a number of server applications and subsystems, including for example an experience analytics server 116. The experience analytics server 116 implements a number of data processing technologies and functions, particularly related to the aggregation and other processing of data including the changes in the interface of the website being displayed on the customer client device 106, the elements on the website being displayed or visible on the interface of the customer client device 106, the text inputs by the user into the website, a movement of a mouse (or touchpad) cursor and mouse (or touchpad) clicks on the interface of the website, etc. received from multiple instances of the experience analytics script 122 on customer client devices 106. The experience analytics server 116 implements processing technologies and functions, related to generating user interfaces including information on errors, insights, merchandising information, adaptability information, images, graphs providing visualizations of experience analytics, session replay videos, zoning and overlays to be applied on the website, etc. Other processor and memory intensive processing of data may also be performed server-side by the experience analytics server 116, in view of the hardware requirements for such processing.

System Architecture

Figure 2:
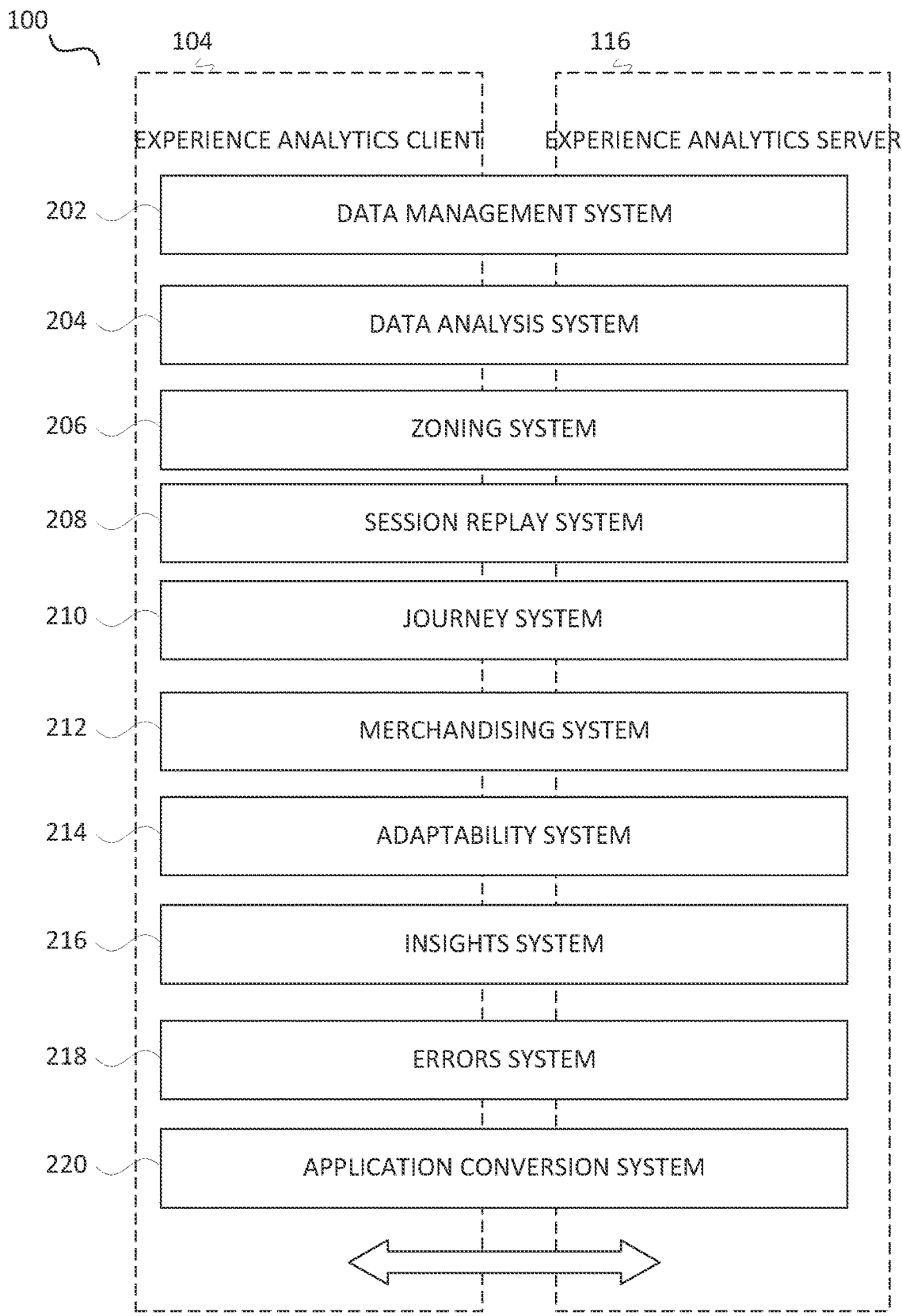
FIG. 2 is a diagrammatic representation of an experience analytics system, in accordance with some examples, that has both client-side and server-side functionality.

FIG. 2 is a block diagram illustrating further details regarding the experience analytics system 100 according to some examples. Specifically, the experience analytics system 100 is shown to comprise the experience analytics client 104 and the experience analytics server 116. The experience analytics system 100 embodies a number of subsystems, which are supported on the client-side by the experience analytics client 104 and on the server-side by the experience analytics server 116. These subsystems include, for example, a data management system 202, a data analysis system 204, a zoning system 206, a session replay system 208, a journey system 210, a merchandising system 212, an adaptability system 214, an insights system 216, an errors system 218, and an application conversion system 220.

The data management system 202 is responsible for receiving functions or data from the member client devices 102, the experience analytics script 122 executed by each of the customer client devices 106, and the third-party servers 108. The data management system 202 is also responsible for exporting data to the member client devices 102 or the third-party servers 108 or between the systems in the experience analytics system 100. The data management system 202 is also configured to manage the third-party integration of the functionalities of experience analytics system 100.

The data analysis system 204 is responsible for analyzing the data received by the data management system 202, generating data tags, performing data science and data engineering processes on the data.

The zoning system 206 is responsible for generating a zoning interface to be displayed by the member client device 102 via the experience analytics client 104. The zoning interface provides a visualization of how the users via the customer client devices 106 interact with each element on the client's website. The zoning interface can also provide an aggregated view of in-page behaviors by the users via the customer client device 106 (e.g., clicks, scrolls, navigation). The zoning interface can also provide a side-by-side view of different versions of the client's website for the client's analysis. For example, the zoning system 206 can identify the zones in a client's website that are associated with a particular element in displayed on the website (e.g., an icon, a text link, etc.). Each zone can be a portion of the website being displayed. The zoning interface can include a view of the client's website. The zoning system 206 can generate an overlay including data pertaining to each of the zones to be overlaid on the view of the client's website. The data in the overlay can include, for example, the number of views or clicks associated with each zone of the client's website within a period of time, which can be established by the user of the member client device 102. In one example, the data can be generated using information from the data analysis system 204.

The session replay system 208 is responsible for generating the session replay interface to be displayed by the member client device 102 via the experience analytics client 104. The session replay interface includes a session replay that is a video reconstructing an individual user's session (e.g., visitor session) on the client's website. The user's session starts when the user arrives at the client's website and ends upon the user's exit from the client's website. A user's session when visiting the client's website on a customer client device 106 can be reconstructed from the data received from the user's experience analytics script 122 on customer client devices 106. The session replay interface can also include the session replays of a number of different visitor sessions to the client's website within a period of time (e.g., a week, a month, a quarter, etc.). The session replay interface allows the client via the member client device 102 to select and view each of the session replays. In one example, the session replay interface can also include an identification of events (e.g., failed conversions, angry customers, errors in the website, recommendations or insights) that are displayed and allow the user to navigate to the part in the session replay corresponding to the events such that the client can view and analyze the event.

The journey system 210 is responsible for generating the journey interface to be displayed by the member client device 102 via the experience analytics client 104. The journey interface includes a visualization of how the visitors progress through the client's website, page-by-page, from entry onto the website to the exit (e.g., in a session). The journey interface can include a visualization that provides a customer journey mapping (e.g., sunburst visualization). This visualization aggregates the data from all of the visitors (e.g., users on different customer client devices 106) to the website, and illustrates the visited pages and in order in which the pages were visited. The client viewing the journey interface on the member client device 102 can identify anomalies such as looping behaviors and unexpected drop-offs. The client viewing the journey interface can also assess the reverse journeys (e.g., pages visitors viewed before arriving at a particular page). The journey interface also allows the client to select a specific segment of the visitors to be displayed in the visualization of the customer journey.

The merchandising system 212 is responsible for generating the merchandising interface to be displayed by the member client device 102 via the experience analytics client 104. The merchandising interface includes merchandising analysis that provides the client with analytics on the merchandise to be promoted on the website, optimization of sales performance, the items in the client's product catalog on a granular level, competitor pricing, etc. The merchandising interface can, for example, comprise graphical data visualization pertaining to product opportunities, category, brand performance, etc. For instance, the merchandising interface can include the analytics on conversions (e.g., sales, revenue) associated with a placement or zone in the client website.

The adaptability system 214 is responsible for creating accessible digital experiences for the client's website to be displayed by the customer client devices 106 for users that would benefit from an accessibility-enhanced version of the client's website. For instance, the adaptability system 214 can improve the digital experience for users with disabilities, such as visual impairments, cognitive disorders, dyslexia, and age-related needs. The adaptability system 214 can, with proper user permissions, analyze the data from the experience analytics script 122 to determine whether an accessibility-enhanced version of the client's website is needed, and can generate the accessibility-enhanced version of the client's website to be displayed by the customer client device 106.

The insights system 216 is responsible for analyzing the data from the data management system 202 and the data analysis system 204 surface insights that include opportunities as well as issues that are related to the client's website. The insights can also include alerts that notify the client of deviations from a client's normal business metrics. The insights can be displayed by the member client devices 102 via the experience analytics client 104 on a dashboard of a user interface, as a pop-up element, as a separate panel, etc. In this example, the insights system 216 is responsible for generating an insights interface to be displayed by the member client device 102 via the experience analytics client 104. In another example, the insights can be incorporated in another interface such as the zoning interface, the session replay, the journey interface, or the merchandising interface to be displayed by the member client device 102.

The errors system 218 is responsible for analyzing the data from the data management system 202 and the data analysis system 204 to identify errors that are affecting the visitors to the client's website and the impact of the errors on the client's business (e.g., revenue loss). The errors can include the location within the user journey on the website and the page that adversely affects (e.g., causes frustration for) the users (e.g., users on customer client devices 106 visiting the client's website). The errors can also include causes of looping behaviors by the users, in-page issues such as unresponsive calls to action and slow loading pages, etc. The errors can be displayed by the member client devices 102 via the experience analytics client 104 on a dashboard of a user interface, as a pop-up element, as a separate panel, etc. In this example, the errors system 218 is responsible for generating an errors interface to be displayed by the member client device 102 via the experience analytics client 104. In another example, the insights can be incorporated in another interface such as the zoning interface, the session replay, the journey interface, or the merchandising interface to be displayed by the member client device 102.

The application conversion system 220 is responsible for the conversion of the functionalities of the experience analytics server 116 as provided to a client's website to a client's native mobile applications. For instance, the application conversion system 220 generates the mobile application version of the zoning interface, the session replay, the journey interface, the merchandising interface, the insights interface, and the errors interface to be displayed by the member client device 102 via the experience analytics client 104. The application conversion system 220 generates an accessibility-enhanced version of the client's mobile application to be displayed by the customer client devices 106.

The data management system 202 may store pageviews or unit prices corresponding to out of stock items. The data analysis system 204 may use the stored pageviews or unit prices, for example along with an average conversion rate, to determine a loss indicator for the out of stock item. The average conversion rate may be stored at the data management system 202. The loss indicator may be output from the experience analytics server 116, for example to a user device for display.

Data Architecture

Figure 3:
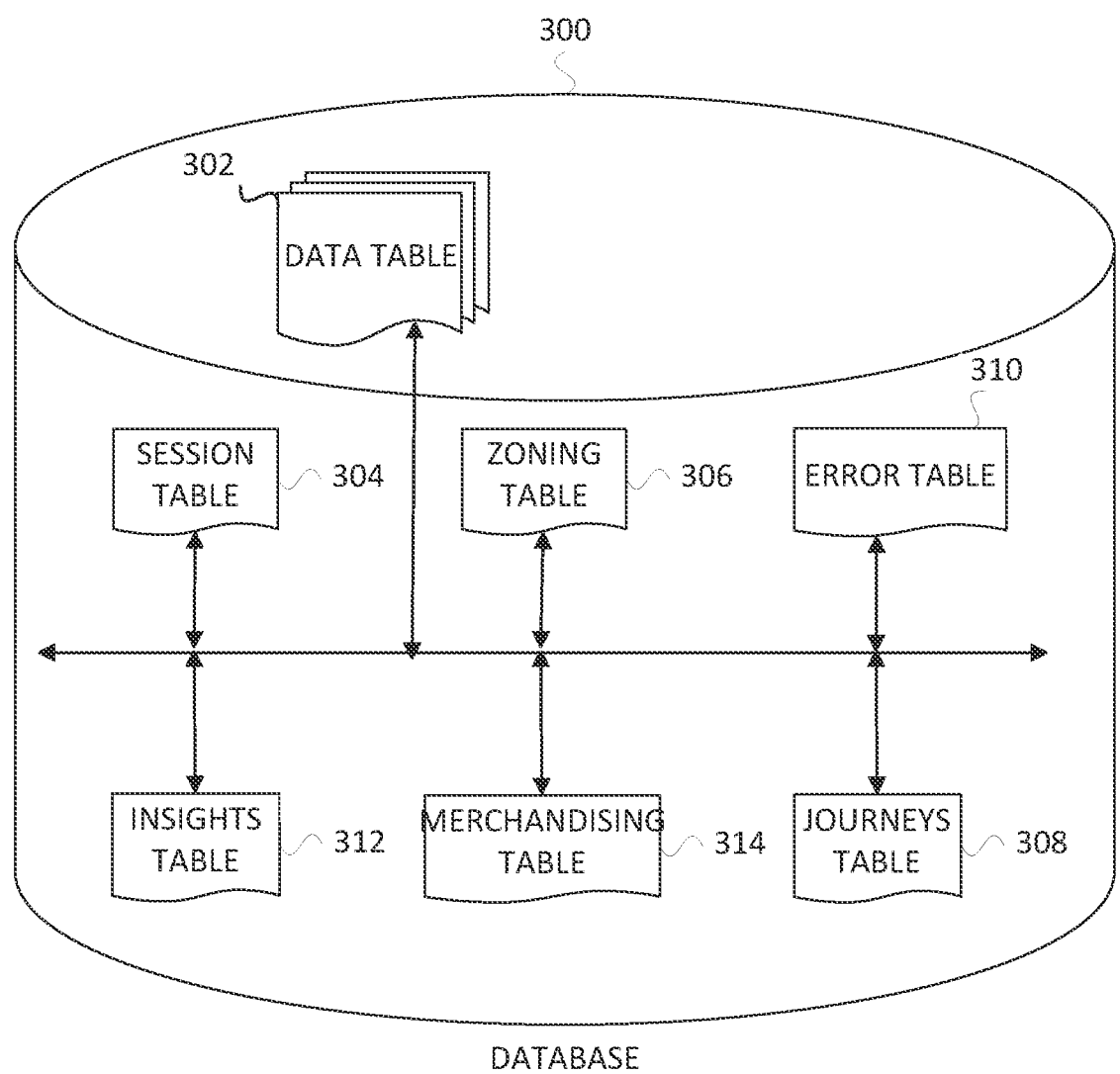
FIG. 3 is a diagrammatic representation of a data structure as maintained in a database, in accordance with some examples.

FIG. 3 is a schematic diagram illustrating database 300, which may be stored in the database 300 of the experience analytics server 116, according to certain examples. While the content of the database 300 is shown to comprise a number of tables, it will be appreciated that the data could be stored in other types of data structures (e.g., as an object-oriented database).

The database 300 includes a data table 302, a session table 304, a zoning table 306, an error table 310, an insights table 312, a merchandising table 314, and a journeys table 308.

The data table 302 stores data regarding the websites and native applications associated with the clients of the experience analytics system 100. The data table 302 can store information on the contents of the website or the native application, the changes in the interface of the website being displayed on the customer client device 106, the elements on the website being displayed or visible on the interface of the customer client device 106, the text inputs by the user into the website, a movement of a mouse (or touchpad or touch screen) cursor and mouse (or touchpad or touch screen) clicks on the interface of the website, etc. The data table 302 can also store data tags and results of data science and data engineering processes on the data. The data table 302 can also store information such as the font, the images, the videos, the native scripts in the website or applications, etc.

The session table 304 stores session replays for each of the client's websites and native applications.

The zoning table 306 stores data related to the zoning for each of the client's websites and native applications including the zones to be created and the zoning overlay associated with the websites and native applications.

The journeys table 308 stores data related to the journey of each visitor to the client's website or through the native application.

The error table 310 stores data related to the errors generated by the errors system 218 and the insights table 312 stores data related to the insights generated by the insights table 312.

The merchandising table 314 stores data associated with the merchandising system 212. For example, the data in the merchandising table 314 can include the product catalog for each of the clients, information on the competitors of each of the clients, the data associated with the products on the websites and applications, the analytics on the product opportunities and the performance of the products based on the zones in the website or application, etc.

Process

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

Figure 4:
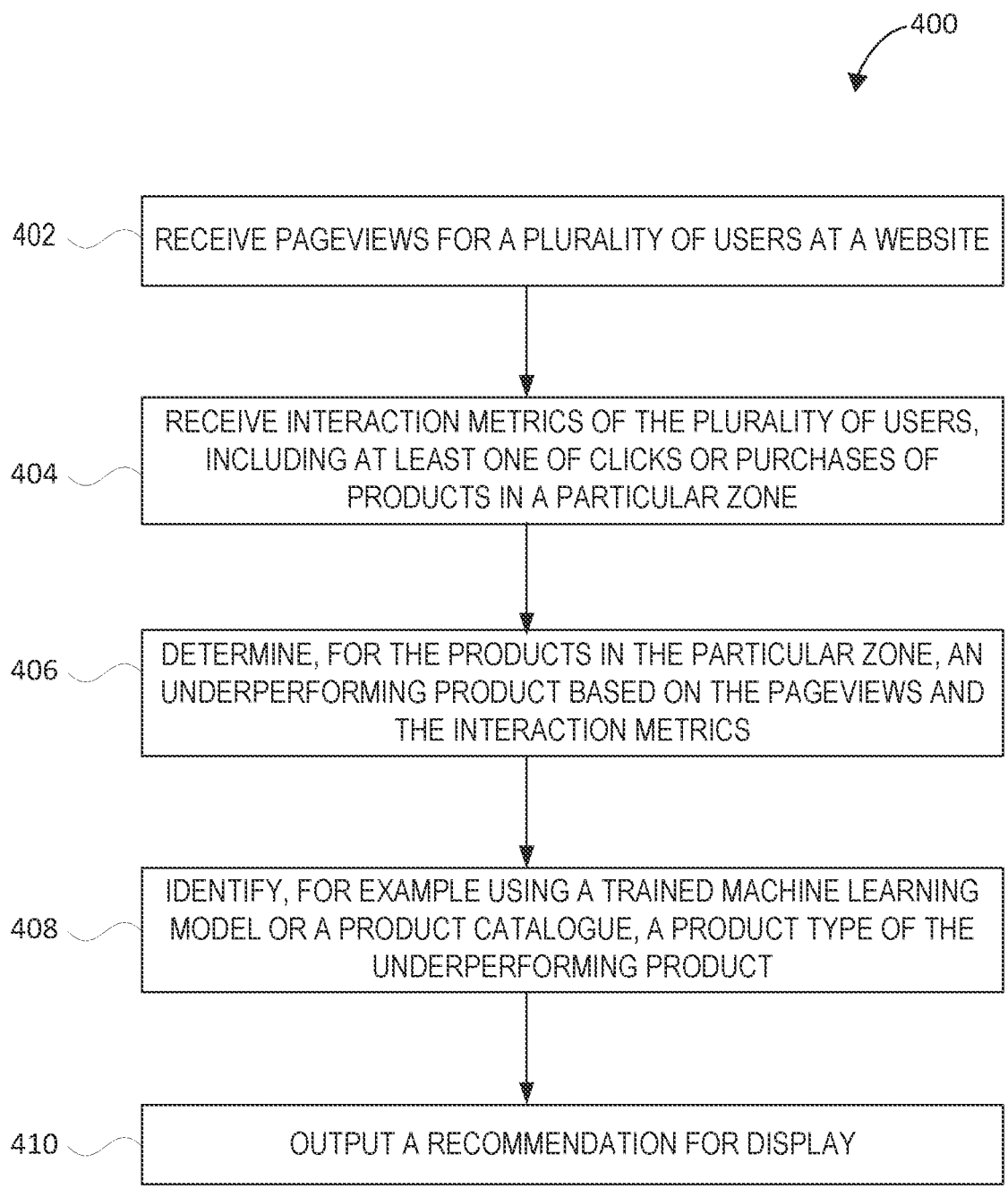
FIG. 4 is a flowchart for a process, in accordance with some examples.

FIG. 4 is a schematic diagram illustrating a process 400, for providing information related to an underperforming product. The process 400 may be executed at a server, using a processor, etc. The process 400 may include providing information (e.g., a recommendation, an insight, etc.) to a client on a client device, for example related to user behavior when interacting with a website.

The process 400 includes an operation 402 to receive (e.g., at a server) pageviews for a plurality of users at a website. The process 400 includes an operation 404 to receiving (e.g., at the server) interaction metrics of the plurality of users, including at least one of clicks or purchases of products in a particular zone.

The process 400 includes an operation 406 to determine, for the products in the particular zone, an underperforming product based on the pageviews and the interaction metrics. Operation 406 may include comparing the underperforming product to at least one other product based on at least one of product attractiveness or conversion. Product attractiveness may include click rate, attractiveness rate, or the like. A conversion may include completed transactions (e.g., purchases) of an item (e.g., the underperforming product, any product from the zone, any product from the website, etc.), a user reaching a cart page, or the like. The underperforming product may have an attribute that indicates or causes its underperformance, such as being out of stock (e.g., for a portion of time under consideration), being overpriced (e.g., compared to prices of other merchants, compared to similar products, compared to products in the particular zone or on the website, etc.), being never clicked or viewed, or the like.

The process 400 includes an operation 408 to identify, for example using a trained machine learning model or a product catalogue, a product type of the underperforming product. The product type may identify a set of products having at least one identical attribute. For example, a specification attribute, such as screen size for a television, shoe color, brass finishing, processor speed, etc. In some examples, the product type may be selected or selectable from one or more degrees of categorization for product types. For example, a relatively narrow degree of categorization may include requiring identical attributes for one or more attributes for products to be similar (e.g., varying by optionally only one attribute, such as color). A relatively broader category may include all product types that share a title word (e.g., all televisions). Other categories may be in the middle, such as all televisions that are within a range of size (e.g., all televisions from 39 inches to 44 inches).

The process 400 includes an operation 410 to output a recommendation for display. The recommendation may include at least one replacement product of the product type, other than the underperforming product, to replace the underperforming product in the particular zone. Before operation 410, the process 400 may include determining the at least one replacement product of the product type. Determining the at least one replacement product of the product type may include identifying a product in stock. Determining the product type may include determining at least one product that is in stock using a similarity model, such as a most similar product to the underperforming product or a product having a highest attractiveness or conversion (e.g., a rate) among products of the product type. The similarity model may identify a most similar product to the underperforming product to use as the at least one of a product in stock determined, using a similarity model, to be most similar to the underperforming product or a product in stock having a highest attractiveness or conversion among products of the product type. In an example, determining the at least one product in stock may include identifying a product in stock having a highest attractiveness or conversion among products of the product type.

The process 400 may include an operation to compare performances of two or more products, zones, websites, or the like. Results of the comparison (e.g., an indication of a relative performance) may be output, for example for display. In some examples, performance of the underperforming product may be compared across two or more zones (e.g., the particular zone and at least one other zone). In another example, performance of two or more zones may be compared. In this example, all products, a set of products, similar products, identical products, or the like may be compared. In yet another example, pages within an overall website, or across different websites may be compared.

The process 400 may include determining the at least one replacement product. This determination may be performed based on a comparison between performance of the at least one replacement product and performance of the underperforming product or other similar products. The at least one replacement product may have a similarity score to the underperforming product greater than a threshold score.

The process 400 may include outputting an insight for the underperforming product. The insight may include a comparison of performance of the underperforming product based on origin sources for the plurality of users accessing the website. For example, performance may be compared among users originating from an online marketplace, an advertisement link, a search result, a direct pageview, a landing page source, or the like.

The process 400 may include identifying at least one reason why the underperforming product is underperforming. The at least one reason may indicate that the underperforming product was out of stock, a price of the underperforming product was high compared to other products of the product type, a similar product had a higher conversion than the underperforming product, or the like.

The process 400 may include analyzing the performance of a category or subcategory of a product across the website. For example, the product or the category of the product may be analyzed against other products in the category or other similar categories to determine relative attractiveness or conversion. This analysis may include consideration of account zones or pages, for example, whether a zone is a promotion banner. An insight may be generated from the analysis, which may be output for display. The insight may include a relative ranking of products, categories, or subcategories.

Machine Architecture

Figure 5:
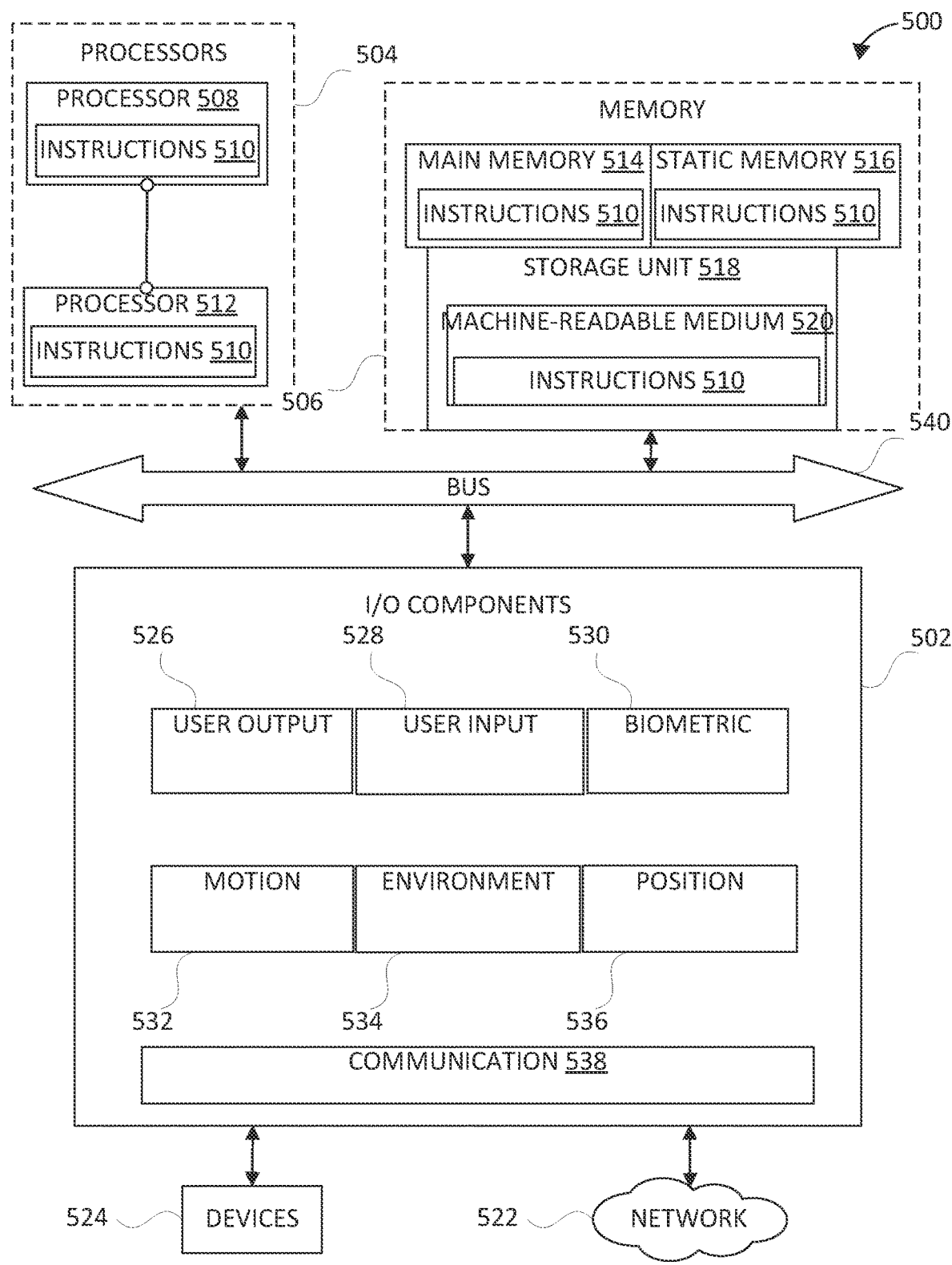
FIG. 5 is a diagrammatic representation of a machine in the form of a computer system within which a set of instructions may be executed for causing the machine to perform any one or more of the methodologies discussed herein, in accordance with some examples.

FIG. 5 is a diagrammatic representation of the machine 500 within which instructions 510 (e.g., software, a program, an application, an applet, an application, or other executable code) for causing the machine 500 to perform any one or more of the methodologies discussed herein may be executed. For example, the instructions 510 may cause the machine 500 to execute any one or more of the methods described herein. The instructions 510 transform the general, non-programmed machine 500 into a particular machine 500 programmed to carry out the described and illustrated functions in the manner described. The machine 500 may operate as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines that individually or jointly execute the instructions 510 to perform any one or more of the methodologies discussed herein. The machine 500, for example, may comprise the member client device 102 or any one of a number of server devices forming part of the experience analytics server 116. In some examples, the machine 500 may also comprise both client and server systems, with certain operations of a particular method or algorithm being performed on the server-side and with certain operations of the particular method or algorithm being performed on the client-side.

The machine 500 may include processors 504, memory 506, and input/output I/O components 502, which may be configured to communicate with each other via a bus 540. In an example, the processors 504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 508 and a processor 512 that execute the instructions 510. The term "processor" is intended to include multi-core processors that may comprise two or more independent processors (sometimes referred to as "cores") that may execute instructions contemporaneously. Although FIG. 5 shows multiple processors 504, the machine 500 may include a single processor with a single-core, a single processor with multiple cores (e.g., a multi-core processor), multiple processors with a single core, multiple processors with multiples cores, or any combination thereof.

The memory 506 includes a main memory 514, a static memory 516, and a storage unit 518, both accessible to the processors 504 via the bus 540. The main memory 506, the static memory 516, and storage unit 518 store the instructions 510 embodying any one or more of the methodologies or functions described herein. The instructions 510 may also reside, completely or partially, within the main memory 514, within the static memory 516, within machine-readable medium 520 within the storage unit 518, within at least one of the processors 504 (e.g., within the processor's cache memory), or any suitable combination thereof, during execution thereof by the machine 500.

The I/O components 502 may include a wide variety of components to receive input, provide output, produce output, transmit information, exchange information, capture measurements, and so on. The specific I/O components 502 that are included in a particular machine will depend on the type of machine. For example, portable machines such as mobile phones may include a touch input device or other such input mechanisms, while a headless server machine will likely not include such a touch input device. It will be appreciated that the I/O components 502 may include many other components that are not shown in FIG. 5. In various examples, the I/O components 502 may include user output components 526 and user input components 528. The user output components 526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 502 may include biometric components 530, motion components 532, environmental components 534, or position components 536, among a wide array of other components. For example, the biometric components 530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 532 include acceleration sensor components (e.g., accelerometer), gravitation sensor components, rotation sensor components (e.g., gyroscope).

The environmental components 534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the member client device 102 may have a camera system comprising, for example, front cameras on a front surface of the member client device 102 and rear cameras on a rear surface of the member client device 102. The front cameras may, for example, be used to capture still images and video of a user of the member client device 102 (e.g., "selfies"). The rear cameras may, for example, be used to capture still images and videos in a more traditional camera mode. In addition to front and rear cameras, the member client device 102 may also include a 360° camera for capturing 360° photographs and videos.

Further, the camera system of a member client device 102 may include dual rear cameras (e.g., a primary camera as well as a depth-sensing camera), or even triple, quad or penta rear camera configurations on the front and rear sides of the member client device 102. These multiple cameras systems may include a wide camera, an ultra-wide camera, a telephoto camera, a macro camera and a depth sensor, for example.

The position components 536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 502 further include communication components 538 operable to couple the machine 500 to a network 522 or devices 524 via respective coupling or connections. For example, the communication components 538 may include a network interface component or another suitable device to interface with the network 522. In further examples, the communication components 538 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 524 may be another machine or any of a wide variety of peripheral devices (e.g., a peripheral device coupled via a USB).

Moreover, the communication components 538 may detect identifiers or include components operable to detect identifiers. For example, the communication components 538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 538, such as location via Internet Protocol (IP) geolocation, location via Wi-Fi® signal triangulation, location via detecting an NFC beacon signal that may indicate a particular location, and so forth.

The various memories (e.g., main memory 514, static memory 516, and memory of the processors 504) and storage unit 518 may store one or more sets of instructions and data structures (e.g., software) embodying or used by any one or more of the methodologies or functions described herein. These instructions (e.g., the instructions 510), when executed by processors 504, cause various operations to implement the disclosed examples.

The instructions 510 may be transmitted or received over the network 522, using a transmission medium, via a network interface device (e.g., a network interface component included in the communication components 538) and using any one of several well-known transfer protocols (e.g., hypertext transfer protocol (HTTP)). Similarly, the instructions 510 may be transmitted or received using a transmission medium via a coupling (e.g., a peer-to-peer coupling) to the devices 524.

Software Architecture

Figure 6:
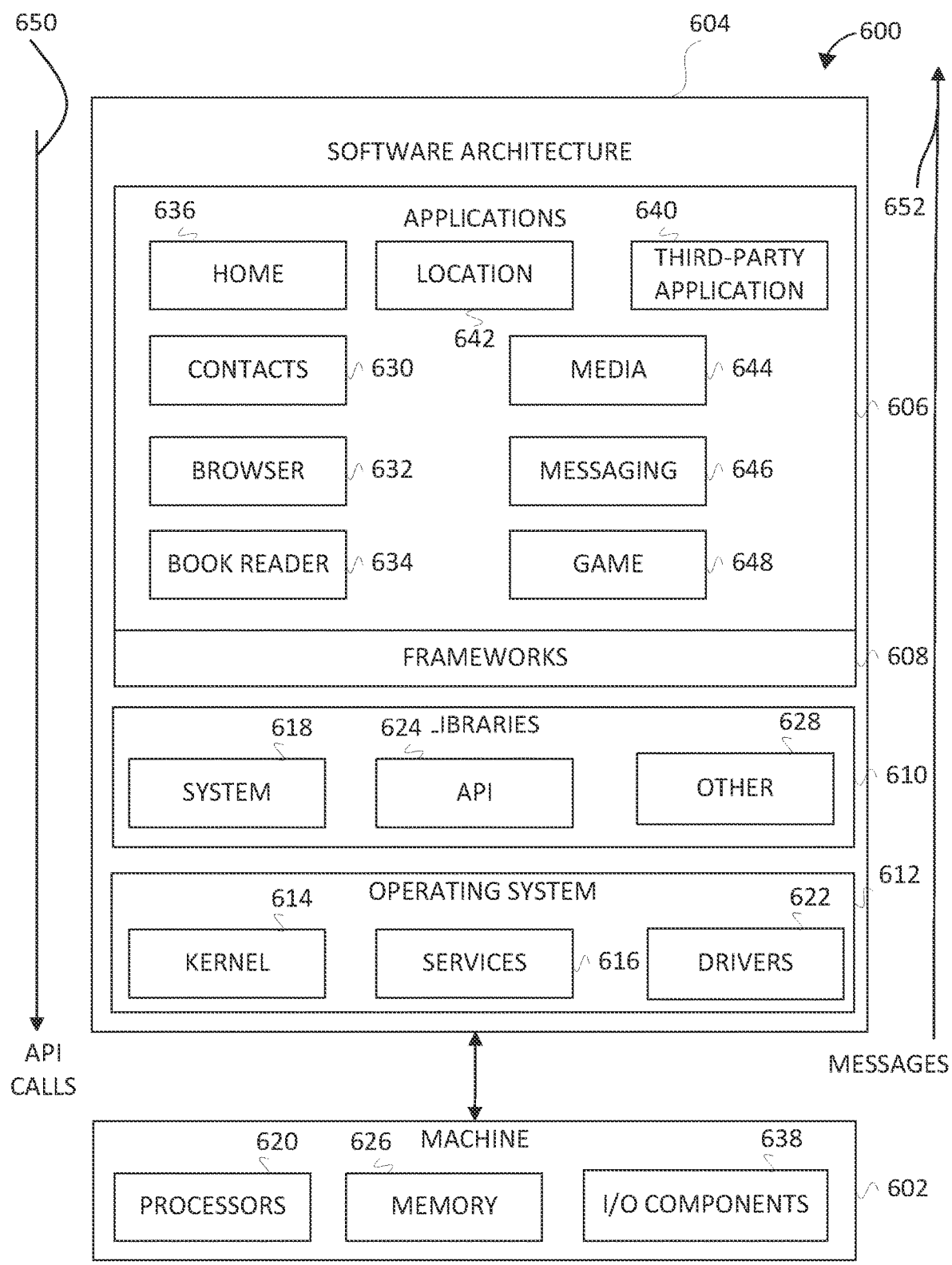
FIG. 6 is a block diagram showing a software architecture within which examples may be implemented.

FIG. 6 is a block diagram 600 illustrating a software architecture 604, which can be installed on any one or more of the devices described herein. The software architecture 604 is supported by hardware such as a machine 602 that includes processors 620, memory 626, and I/O components 638. In this example, the software architecture 604 can be conceptualized as a stack of layers, where each layer provides a particular functionality. The software architecture 604 includes layers such as an operating system 612, libraries 610, frameworks 608, and applications 606. Operationally, the applications 606 invoke API calls 650 through the software stack and receive messages 652 in response to the API calls 650.

The operating system 612 manages hardware resources and provides common services. The operating system 612 includes, for example, a kernel 614, services 616, and drivers 622. The kernel 614 acts as an abstraction layer between the hardware and the other software layers. For example, the kernel 614 provides memory management, processor management (e.g., scheduling), component management, networking, and security settings, among other functionalities. The services 616 can provide other common services for the other software layers. The drivers 622 are responsible for controlling or interfacing with the underlying hardware. For instance, the drivers 622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 610 provide a common low-level infrastructure used by the applications 606. The libraries 610 can include system libraries 618 (e.g., C standard library) that provide functions such as memory allocation functions, string manipulation functions, mathematic functions, and the like. In addition, the libraries 610 can include API libraries 624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 610 can also include a wide variety of other libraries 628 to provide many other APIs to the applications 606.

The frameworks 608 provide a common high-level infrastructure that is used by the applications 606. For example, the frameworks 608 provide various graphical user interface (GUI) functions, high-level resource management, and high-level location services. The frameworks 608 can provide a broad spectrum of other APIs that can be used by the applications 606, some of which may be specific to a particular operating system or platform.

In an example, the applications 606 may include a home application 636, a contacts application 630, a browser application 632, a book reader application 634, a location application 642, a media application 644, a messaging application 646, a game application 648, and a broad assortment of other applications such as a third-party application 640. The applications 606 are programs that execute functions defined in the programs. Various programming languages can be employed to create one or more of the applications 606, structured in a variety of manners, such as object-oriented programming languages (e.g., Objective-C, Java, or C++) or procedural programming languages (e.g., C or assembly language). In a specific example, the third-party application 640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 640 can invoke the API calls 650 provided by the operating system 612 to facilitate functionality described herein.

User Interfaces

FIG. 7 illustrates an example of a client user interface 700 including product performance with a zone analysis in accordance with some examples. The client user interface 700 shows product performance of various products, such as products in a zone, or similar or same products across two or more zones. The products may be searched or filtered, such as based on a date range, a zone, a product type, etc. The client user interface 700 includes insights related to a website (e.g., as accessed by users via the internet).

The insights displayed on the client user interface 700 may include display of a product (or in the example client user interface 700 five products) that are underperforming. The underperforming products may include products that have a relatively low attractiveness rate, conversion rate, etc. In the example of the client user interface 700, the five products have zero clicks in the time period (e.g., a week in January), but other example thresholds for attractiveness rate (e.g., fewer than five clicks) or conversion rate may be used.

The underperforming products are displayed with an item identifier, such as a UPC, a category, a name, and a number of times the underperforming product was displayed in a particular zone. In some examples, the "displayed in zone" column may identify a particular zone, in some examples, all underperforming products displayed in the client user interface 700 may correspond to a particular zone, or the like. An attractiveness rate may correspond to a number of times a product was clicked divided by a number of times displayed in a zone. Attractiveness rate may include a percentage of clicks when the product is seen. A product may be displayed but not seen (e.g., if it is at the bottom of the page a user may not scroll enough to see it). The underperforming products may be sorted by number of times clicked (e.g., showing the most underperforming products to the least underperforming products by ranking the fewest clicks to most clicks). When the number of times clicked is zero, as is the case for all of the underperforming products in the client user interface 700, the underperforming products may be sorted by number of times displayed in a zone to illustrate attractiveness (e.g., more displays with zero clicks is less attractive, and thus more underperforming).

The underperforming products may be sorted or filtered by category, name, brand, zone, or the like. The underperforming products may be identified for a particular zone over a time period. When identified, the underperforming products may be selected or a second client user interface may be accessed to view a suggested replacement product (e.g., see below with respect to FIG. 8). The status of an underperforming product may be updated using the client user interface 700. In some examples, the client user interface 700 may display a set of underperforming products for a set of zones.

The underperforming products may include products that are out of stock products, never clicked products, products with a lowest conversion rate or attractiveness rate in a zone, or the like. For each product identified, a recommended replacement product may be determined. The recommended replacement product may include a most similar product in stock (e.g., identified using similarity models such as those discussed below with respect to FIG. 9 or a product catalogue) or an in stock category best selling product. In either example the category may vary, being narrowly tailored (e.g., all same specifications) or broad (same generic product name).

Figure 8:
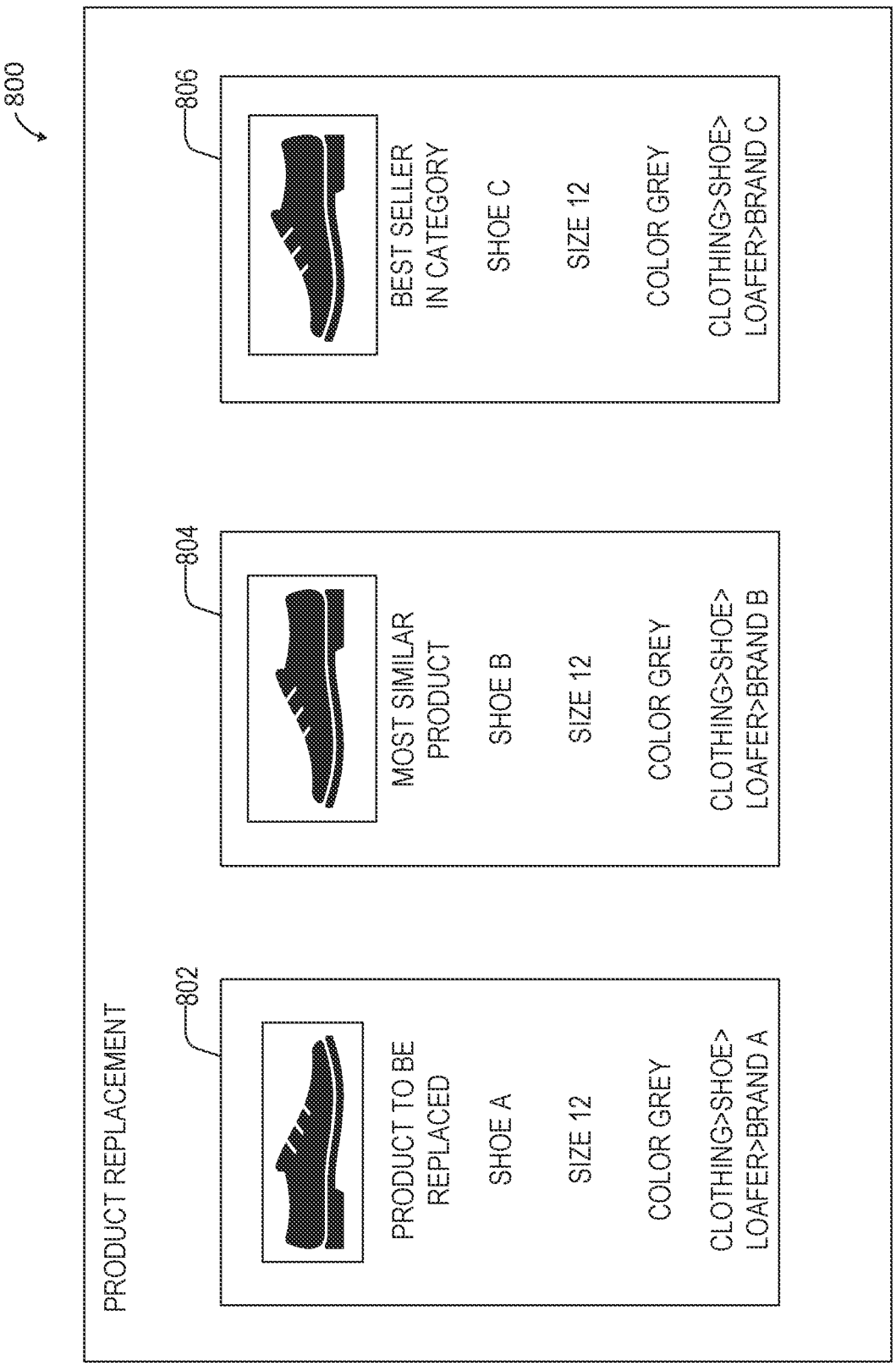
FIG. 8 illustrates user interface showing a client user interface including a product replacement recommendation in accordance with some examples.

FIG. 8 illustrates an example including a client user interface 800 showing a product replacement recommendation in accordance with some examples. The client user interface 800 includes a component 802 showing information related to a product to be replaced (e.g., an underperforming product, such as those identified using the client user interface 700 of FIG. 7), and optionally component 804 or 806 or both. Component 804 shows information related to a product most similar to the product to be replaced. Component 806 shows information related to a best selling product in a same category as the product to be replaced.

The most similar or best selling product may be identified at a variety of category level depths. For example, the category may be narrow (e.g., only size 12 grey loafers, as shown in FIG. 8), broad (e.g., all shoes), or somewhere in between (e.g., all size 12 shoes, regardless of color). In an example, a broadest category may include one that includes the most products while maintaining at least one attribute in common among all products in the category (e.g., all products are shoes, all products are tables, all products are speakers, all products have screens, etc.). A narrowest category may include one where all products have identical specifications or differ by only a single attribute (e.g., differ only by brand or only by color, for example). Any level of attribute matching between the narrowest and broadest may be used as an intermediate level (e.g., requiring 2, 3, 4, all but 2, all but 3, all but 4, attributes to match). In some examples, a user may select a category directly, or may select a category by narrowness or breadth.

To determine whether two products are a match, they may be compared and their similarity may be quantified. In some examples, the similarity of products may be calculated, and a threshold may be determined to identify whether products are close enough (e.g., a match) or not close enough (e.g., a non-match). Thresholding may include using product pairs as an input, which may include matches or non-matches. The embeddings of the product pairs may be calculated. Embeddings may be computed using product title, product image, user interactions, or the like. The distance (e.g., Euclidean distance) may be determined between the embeddings of product pairs. In some examples, an average distance of match pairs and an average distance of non-match pairs may be compared. In some examples, results of the comparison may indicate that thresholding may provide a robust solution. In other examples, results of the comparison may show that in the given embedding space matches and non-matches are not separable by thresholding and additional learning on the products embeddings may be needed. To learn a function on product embeddings, a classifier, such as a support-vector machine (SVM) classifier may be used.

SVM classification may include a linear binary SVM classifier, in some examples. To learn a function upon product pair embeddings, the linear binary SVM classifier may output 1 when a product pair is a match and 0 when the product pair is not a match. The learning on embeddings may be constructed including embedding vectors subtraction with an absolute operation to learn weights of per feature distance, embedding vectors subtraction with a square operation to learn weights of per feature distance in a quadratic distance space, concatenation of embedding vectors to learn weights of separate features of both embeddings, or the like.

After identifying a match or non-match, postprocessing may be performed. Some false positive or false negative examples may be corrected by performing a check of certain keywords in the titles. For example, the errors may be corrected by detecting a brand mismatch, a color mismatch, a code word match, or the like. The errors may be corrected by checking whether a characteristic is the same (e.g., top or front loading for washing machine).

Figure 9:
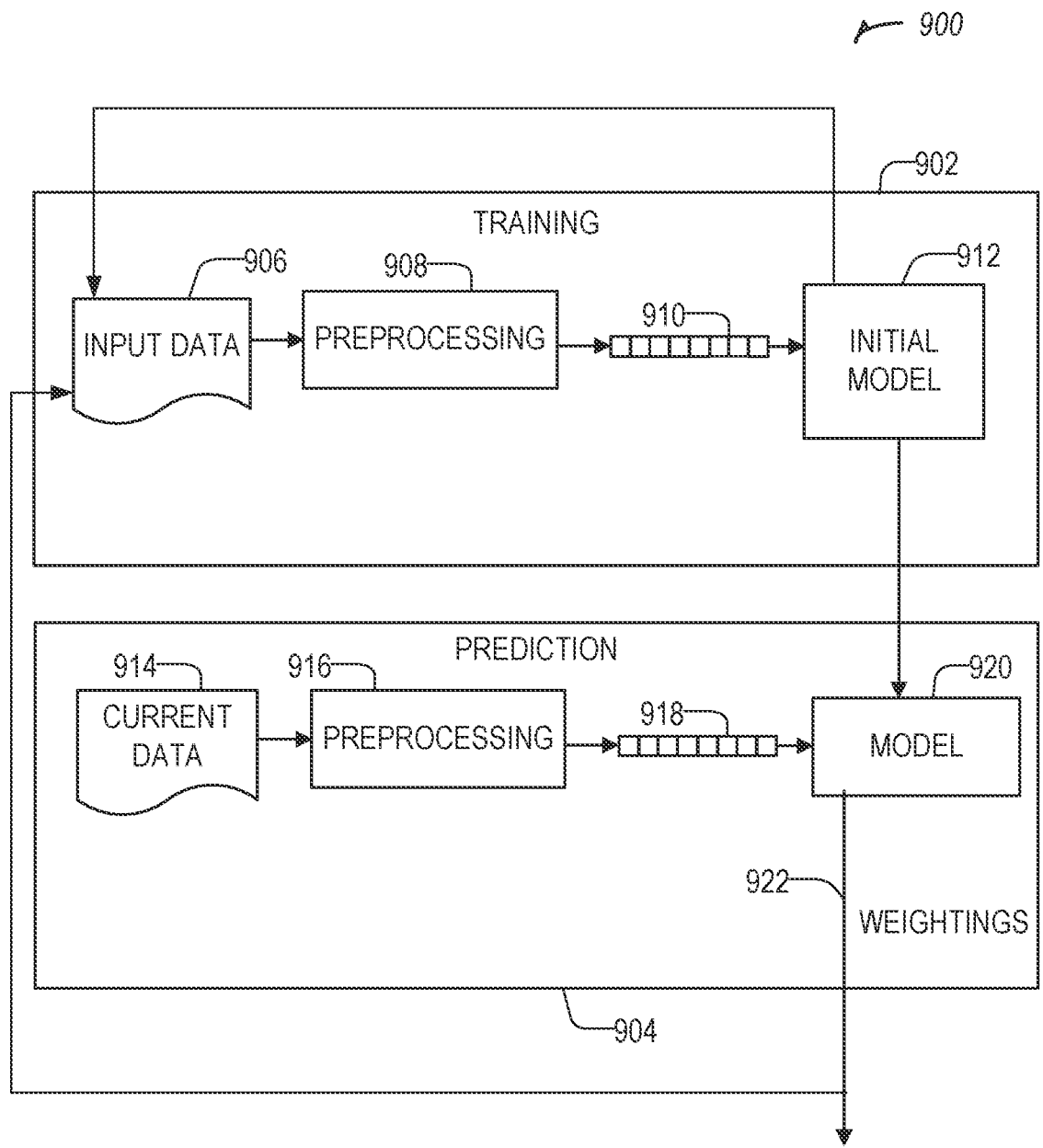
FIG. 9 illustrates a machine learning engine for training and execution related to identifying similar products in accordance with some examples of this disclosure.

FIG. 9 illustrates a machine learning engine for training and execution related to identifying similar products in accordance with some embodiments. The machine learning engine can be deployed to execute at a mobile device (e.g., a cell phone) or a computer. A system may calculate one or more weightings for criteria based upon one or more machine learning algorithms. FIG. 9 shows an example machine learning engine 900 according to some examples of the present disclosure.

Machine learning engine 900 utilizes a training engine 902 and a prediction engine 904. Training engine 902 uses input data 906, after undergoing preprocessing component 908, to determine one or more features 910. The one or more features 910 may be used to generate an initial model 912, which may be updated iteratively or with future unlabeled data.

The input data 906 may include information corresponding to two or more products, where a similarity is identified by product attributes or interactions with the products. Input information may include a product title or name, a product category, a product brand, a product description, a product review, a product image, a user's interaction with a product, such as a sequence of products added to cart, a sequence of product views, a transaction, a number of times a product or set of products appear in a search result or search results, a number of product views, a number of times products are cross sold or suggested for cross selling a number of times a product is in a particular zone or a number of times a set of products appear in a zone together, a number of users arriving at a product page or website with the product from an online marketplace, a number of users arriving at a product page or website with the product from social media, a number of users arriving at a product page or website with the product from an advertisement, in stock or out of stock data for a product, a price of a product (e.g., compared to a competitor product), or the like. In some examples, the input data 906 may include both product information and user interactions, for example, using a constructed Product Knowledge Graph. Labels for the input data may include similar products. In an example, labels for the input data may include a number of times a product is in a final basket, a number of times a product is purchased, a number of times any product is purchased when a product is clicked, or the like. In some cases, the input data may be unlabeled. The input data 906 may be generated from a source, such as one or more of a product catalogue, user transaction data, user interaction data (e.g., with a website), a revenue data report, or the like.

In the prediction engine 904, current data 914 may be input to preprocessing component 916. In some examples, preprocessing component 916 and preprocessing component 908 are the same. The prediction engine 904 produces feature vector 918 from the preprocessed current data, which is input into the model 920 to generate one or more criteria weightings 922. The criteria weightings 922 may be used to output a prediction, as discussed further below.

The training engine 902 may operate in an offline manner to train the model 920 (e.g., on a server). The prediction engine 904 may be designed to operate in an online manner (e.g., in real-time, at a mobile device, on an implant device, etc.). In other examples, the training engine 902 may operate in an online manner (e.g., at a mobile device). In some examples, the model 920 may be periodically updated via additional training (e.g., via updated input data 906 or based on labeled or unlabeled data output in the weightings 922) or client feedback (e.g., an update to a product catalogue, a website, a naming convention, an image or image set, etc.). The initial model 912 may be updated using further input data 906 until a satisfactory model 920 is generated. The model 920 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 902 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 902. In an example embodiment, a regression model is used and the model 920 is a vector of coefficients corresponding to a learned importance for each of the features in the vector of features 910, 918. Once trained, the model 920 may output one or more similar products to an identified product (e.g., an out of stock product).

Figure 10:
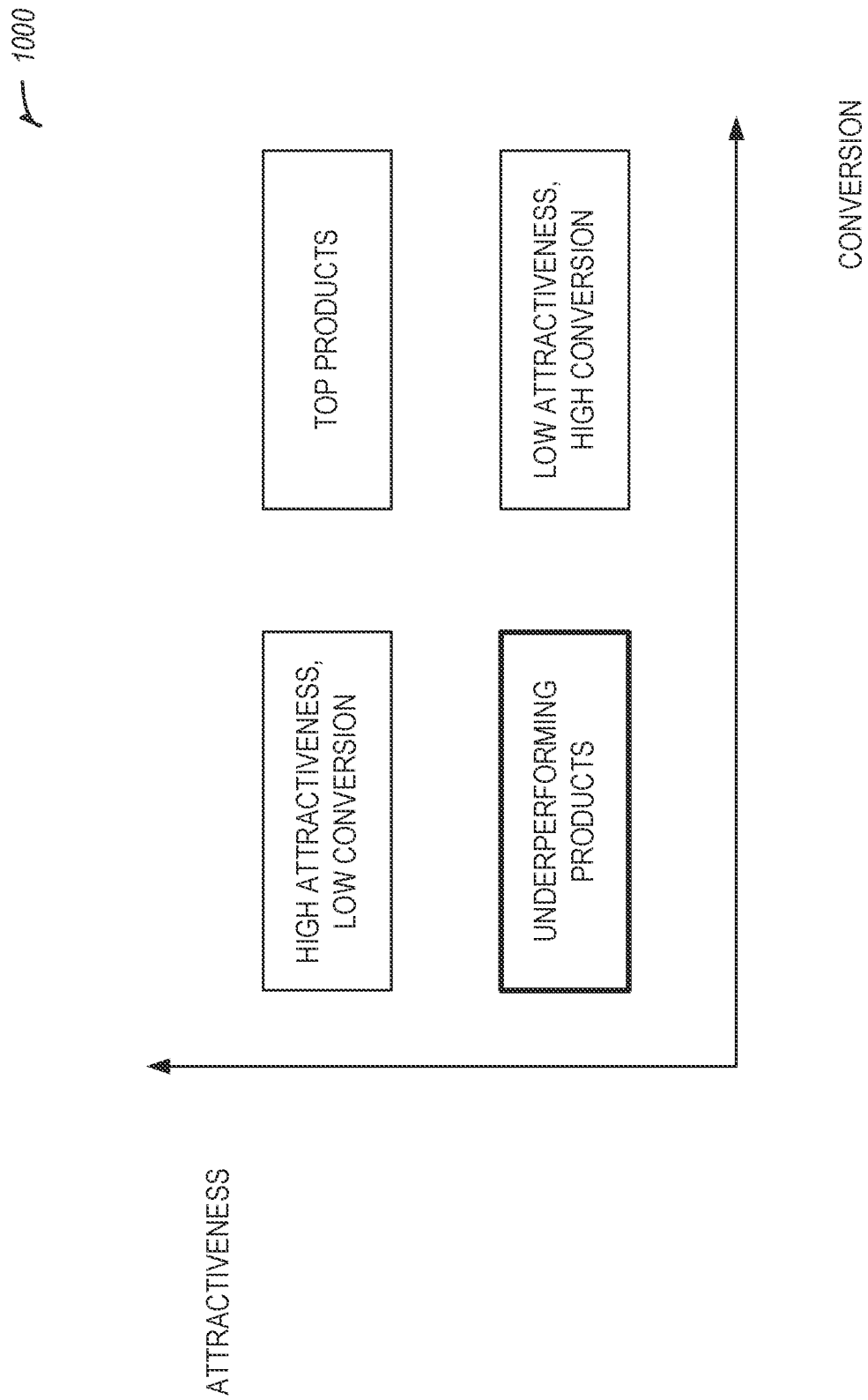
FIG. 10 illustrates a chart showing underperforming products in accordance with some examples.

FIG. 10 illustrates a chart 1000 showing underperforming products in accordance with some examples. The chart 1000 includes four types of products according to attractiveness (y-axis) and conversion (x-axis). Those products with a high attractiveness and high conversion are the top products (e.g., best selling, most profitable, etc.). Products with a high attractiveness but a low conversion are less successful than the top products, but still may be useful for drawing in users, and keeping them engaged (as they possibly buy other products). Products with a high conversion but a low attractiveness are less successful than the top products, but this may be due to some factor other than the products themselves (e.g., difficult to find in a website, not highly promoted, difficult to search, etc.). Products with both low attractiveness and low conversion are found in the set of underperforming products.

Identified underperforming products may be used for analyzing product performance in a given zone. To define an underperforming product, the two factors shown in chart 1000 may be used, namely product attractiveness (e.g., click rate, attractiveness rate, etc.) and conversion generated by the product (e.g., transaction, reach cart page, etc.). In some examples, median values of attractiveness or conversion may be used to identify which group a product belongs to. The median may be computed among similar products (e.g., same category). In some examples, attractiveness or conversion may include click rate, such as a percentage of times a product was clicked when it was displayed, attractiveness rate, such as a percentage of times the product was clicked when it was seen, conversion rate and revenue, such as a percentage of times that an e-commerce transaction was completed during a session where users clicked a product when it was displayed, or product conversion rate, such as a percentage of times a product was purchased during a session where users clicked a product when it was displayed.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Example 1 is a method comprising: receiving, at a server, pageviews for a plurality of users at a website; receiving, at the server, interaction metrics of the plurality of users, including at least one of clicks or purchases of products in a particular zone; determining, for the products in the particular zone, an underperforming product based on the pageviews and the interaction metrics; identifying, using a trained machine learning model, a product type of the underperforming product; and outputting a recommendation for display, the recommendation including at least one replacement product of the product type, other than the underperforming product, to replace the underperforming product in the particular zone.

In Example 2, the subject matter of Example 1 includes, wherein determining the underperforming product includes comparing the underperforming product to at least one other product based on at least one of product attractiveness or conversion.

In Example 3, the subject matter of Examples 1-2 includes, wherein the at least one replacement product includes at least one of a product in stock determined, using a similarity model, to be most similar to the underperforming product or a product in stock having a highest attractiveness or conversion among products of the product type.

In Example 4, the subject matter of Examples 1-3 includes, wherein the underperforming product has at least one attribute of being out of stock, being overpriced, or being never clicked.

In Example 5, the subject matter of Examples 1-4 includes, wherein the product type identifies a set of products having at least one identical attribute.

In Example 6, the subject matter of Examples 1-5 includes, comparing performance of the underperforming product in at least one other zone to the particular zone; and outputting an indication of a relative performance of the underperforming product between the at least one other zone and the particular zone.

In Example 7, the subject matter of Examples 1-6 includes, comparing performance of all products in at least one other zone to performance of the products in the particular zone; and outputting an indication of a relative performance of the at least one other zone and the particular zone.

In Example 8, the subject matter of Examples 1-7 includes, determining the at least one replacement product based on a comparison between performance of the at least one replacement product and performance of the underperforming product, the at least one replacement product having a similarity score to the underperforming product greater than a threshold score.

In Example 9, the subject matter of Examples 1-8 includes, outputting an insight for the underperforming product, the insight including a comparison of performance of the underperforming product based on origin sources for the plurality of users accessing the website.

In Example 10, the subject matter of Examples 1-9 includes, identifying at least one reason why the underperforming product is underperforming, including that the underperforming product was out of stock, a price of the underperforming product was high compared to other products of the product type, or a similar product had a higher conversion than the underperforming product.

Example 11 is a computing apparatus, the computing apparatus comprising: a processor; and a memory storing instructions that, when executed by the processor, configure the computing apparatus to: receive pageviews for a plurality of users at a website; receive interaction metrics of the plurality of users, including at least one of clicks or purchases of products in a particular zone; determine, for the products in the particular zone, an underperforming product based on the pageviews and the interaction metrics; identify, using a trained machine learning model, a product type of the underperforming product; and output a recommendation for display, the recommendation including at least one replacement product of the product type, other than the underperforming product, to replace the underperforming product in the particular zone.

In Example 12, the subject matter of Examples 1-11 includes, wherein the instructions to determine the underperforming product include instructions to compare the underperforming product to at least one other product based on at least one of product attractiveness or conversion.

In Example 13, the subject matter of Examples 1-12 includes, wherein the at least one replacement product includes at least one of a product in stock determined, using a similarity model, to be most similar to the underperforming product or a product in stock having a highest attractiveness or conversion among products of the product type.

In Example 14, the subject matter of Examples 1-13 includes, wherein the instructions further configure the computing apparatus to: compare performance of the underperforming product in at least one other zone to the particular zone; and output an indication of a relative performance of the underperforming product between the at least one other zone and the particular zone.

In Example 15, the subject matter of Examples 1-14 includes, wherein the instructions further configure the computing apparatus to: compare performance of all products in at least one other zone to performance of the products in the particular zone; and output an indication of a relative performance of the at least one other zone and the particular zone.

In Example 16, the subject matter of Examples 1-15 includes, wherein the instructions further configure the computing apparatus to determine the at least one replacement product based on a comparison between performance of the at least one replacement product and performance of the underperforming product, the at least one replacement product having a similarity score to the underperforming product greater than a threshold score.

In Example 17, the subject matter of Examples 1-16 includes, wherein the instructions further configure the computing apparatus to output an insight for the underperforming product, the insight including a comparison of performance of the underperforming product based on origin sources for the plurality of users accessing the website.

In Example 18, the subject matter of Examples 1-17 includes, wherein the instructions further configure the computing apparatus to identify at least one reason why the underperforming product is underperforming, including that the underperforming product was out of stock, a price of the underperforming product was high compared to other products of the product type, or a similar product had a higher conversion than the underperforming product.

Example 19 is at least one non-transitory machine-readable medium, including instructions, which when executed by processing circuitry, cause the processing circuitry to perform operations to: receive pageviews for a plurality of users at a website; receive interaction metrics of the plurality of users, including at least one of clicks or purchases of products in a particular zone; determine, for the products in the particular zone, an underperforming product based on the pageviews and the interaction metrics: identify, using a trained machine learning model, a product type of the underperforming product; and output a recommendation for display, the recommendation including at least one replacement product of the product type, other than the underperforming product, to replace the underperforming product in the particular zone.

In Example 20, the subject matter of Examples 1-19 includes, wherein the at least one replacement product includes at least one of a product in stock determined, using a similarity model, to be most similar to the underperforming product or a product in stock having a highest attractiveness or conversion among products of the product type.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

What is claimed is:

1. A method comprising:
   receiving, at a server, pageviews for a plurality of users at a website;
   receiving, at the server, interaction metrics of the plurality of users, including purchases of products in a particular zone;
   determining, for the products in the particular zone, an underperforming product based on the pageviews and the interaction metrics;

identifying, using a trained machine learning model, a product type of the underperforming product, the trained machine learning model trained using a product similarity match threshold for embeddings of product pairs used as inputs;

outputting a recommendation for display, the recommendation including at least one replacement product of the product type, other than the underperforming product, to replace the underperforming product in the particular zone; and updating the trained machine learning model using the product type of the underperforming product.

2. The method of claim 1, wherein determining the underperforming product includes comparing the underperforming product to at least one other product based on at least one of product attractiveness or conversion.

3. The method of claim, 1 wherein the at least one replacement product includes at least one of a product in stock determined, using a similarity model, to be most similar to the underperforming product or a product in stock having a highest attractiveness or conversion among products of the product type.

4. The method of claim 1, wherein the underperforming product has at least one attribute of being out of stock, being overpriced, or being never clicked.

5. The method of claim 1, wherein the product type identifies a set of products having at least one identical attribute.

6. The method of claim 1, further comprising:
comparing performance of the underperforming product in at least one other zone to the particular zone; and
outputting an indication of a relative performance of the underperforming product between the at least one other zone and the particular zone.

7. The method of claim 1, further comprising:
comparing performance of all products in at least one other zone to performance of the products in the particular zone; and
outputting an indication of a relative performance of the at least one other zone and the particular zone.

8. The method of claim 1, further comprising determining the at least one replacement product based on a comparison between performance of the at least one replacement product and performance of the underperforming product, the at least one replacement product having a similarity score to the underperforming product greater than a threshold score.

9. The method of claim 1, further comprising outputting an insight for the underperforming product, the insight including a comparison of performance of the underperforming product based on origin sources for the plurality of users accessing the website.

10. The method of claim 1, further comprising identifying at least one reason why the underperforming product is underperforming, including that the underperforming product was out of stock, a price of the underperforming product was high compared to other products of the product type, or a similar product had a higher conversion than the underperforming product.

11. A computing apparatus, the computing apparatus comprising:
a processor; and
a memory storing instructions that, when executed by the processor, configure the computing apparatus to:
receive pageviews for a plurality of users at a website;
receive interaction metrics of the plurality of users, including purchases of products in a particular zone;

determine, for the products in the particular zone, an underperforming product based on the pageviews and the interaction metrics;

identify, using a trained machine learning model, a product type of the underperforming product, the trained machine learning model trained using a product similarity match threshold for embeddings of product pairs used as inputs;

output a recommendation for display, the recommendation including at least one replacement product of the product type, other than the underperforming product, to replace the underperforming product in the particular zone, and updating the trained machine learning model using the product type of the underperforming product.

12. The computing apparatus of claim 11, wherein the instructions to determine the underperforming product include instructions to compare the underperforming product to at least one other product based on at least one of product attractiveness or conversion.

13. The computing apparatus of claim 11, wherein the at least one replacement product includes at least one of a product in stock determined, using a similarity model, to be most similar to the underperforming product or a product in stock having a highest attractiveness or conversion among products of the product type.

14. The computing apparatus of claim 11, wherein the instructions further configure the computing apparatus to:
compare performance of the underperforming product in at least one other zone to the particular zone; and
output an indication of a relative performance of the underperforming product between the at least one other zone and the particular zone.

15. The computing apparatus of claim 11, wherein the instructions further configure the computing apparatus to:
compare performance of all products in at least one other zone to performance of the products in the particular zone; and
output an indication of a relative performance of the at least one other zone and the particular zone.

16. The computing apparatus of claim 11, wherein the instructions further configure the computing apparatus to determine the at least one replacement product based on a comparison between performance of the at least one replacement product and performance of the underperforming product, the at least one replacement product having a similarity score to the underperforming product greater than a threshold score.

17. The computing apparatus of claim 11, wherein the instructions further configure the computing apparatus to output an insight for the underperforming product, the insight including a comparison of performance of the underperforming product based on origin sources for the plurality of users accessing the website.

18. The computing apparatus of claim 11, wherein the instructions further configure the computing apparatus to identify at least one reason why the underperforming product is underperforming, including that the underperforming product was out of stock, a price of the underperforming product was high compared to other products of the product type, or a similar product had a higher conversion than the underperforming product.

19. At least one non-transitory machine-readable medium, including instructions, which when executed by processing circuitry, cause the processing circuitry to perform operations to:

receive pageviews for a plurality of users at a website;
receive interaction metrics of the plurality of users, including purchases of products in a particular zone;
determine, for the products in the particular zone, an underperforming product based on the pageviews and the interaction metrics;
identify, using a trained machine learning model, a product type of the underperforming product, the trained machine learning model trained using a product similarity match threshold for embeddings of product pairs used as inputs;
output a recommendation for display, the recommendation including at least one replacement product of the product type, other than the underperforming product, to replace the underperforming product in the particular zone, and
updating the trained machine learning model using the product type of the underperforming product.

20. The at least one machine-readable memory of claim 19, wherein the at least one replacement product includes at least one of a product in stock determined, using a similarity model, to be most similar to the underperforming product or a product in stock having a highest attractiveness or conversion among products of the product type.

\* \* \* \* \*